(12) United States Patent
Wilson et al.

(10) Patent No.: US 8,824,085 B2
(45) Date of Patent: Sep. 2, 2014

(54) LASER POWER CONTROL IN A HEAT-ASSISTED MAGNETIC RECORDING SYSTEM

(71) Applicant: LSI Corporation, Milpitas, CA (US)

(72) Inventors: Ross S. Wilson, Menlo Park, CA (US); Jason P. Brenden, Woodbury, MN (US); Toan V. Tran, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/666,243

(22) Filed: Nov. 1, 2012

(65) Prior Publication Data
US 2014/0119164 A1    May 1, 2014

(51) Int. Cl.
G11B 5/02    (2006.01)

(52) U.S. Cl.
USPC .................. 360/59; 369/13.26; 369/53.26

(58) Field of Classification Search
None
See application file for complete search history.

(56) References Cited

U.S. PATENT DOCUMENTS

| | | | |
|---|---|---|---|
| 8,149,653 B2 | 4/2012 | Shimazawa et al. | |
| 2011/0228653 A1* | 9/2011 | Shimazawa et al. | ....... 369/13.32 |
| 2012/0008470 A1 | 1/2012 | Shimazawa et al. | |
| 2012/0176874 A1 | 7/2012 | Komura et al. | |

* cited by examiner

*Primary Examiner* — Wayne Young
*Assistant Examiner* — Brian Butcher
(74) *Attorney, Agent, or Firm* — Suiter Swantz pc llo (57) ABSTRACT

A heat-assisted magnetic recording system may include, but is not limited to: at least one magnetic recording read/write head; at least one laser diode configured to illuminate at least a portion of at least one magnetic recording medium; at least one laser power level sensor configured to detect a power level of the at least one laser diode; and a controller configured to modify one or more power level settings associated with the at least one laser diode in response to one or more output signals of the at least one laser power level sensor.

19 Claims, 6 Drawing Sheets

LASER POWER CONTROL IN A HEAT-ASSISTED MAGNETIC RECORDING SYSTEM

BACKGROUND

Heat-assisted magnetic recording (HAMR) is a technology that magnetically records data on high-stability media using laser thermal assistance to first heat the material. HAMR takes advantage of high-stability magnetic compounds such as iron platinum alloy. These materials can store single bits in a much smaller area without being limited by the same superparamagnetic effect that limits the current technology used in hard disk storage.

High-density digital recording requires small grain size hence increased susceptibility to thermally-induced paramagnetism and decay of written information. Increasing the ferromagnetic anisotropy of the medium may reduce the paramagnetic phenomena but may require excessive write fields.

Heat-Assisted Magnetic Recording (HAMR) may resolve the writeability versus longevity dilemma by using a beam from a laser diode to raise the temperature of the medium in the vicinity of a written transition to near the Curie point, allowing the writer to switch the medium.

SUMMARY

The present invention proposes means to implement a sample-data approach to laser power monitoring in HAMR. A HAMR system may include, but is not limited to: at least one magnetic recording read/write head; at least one laser diode configured to illuminate at least a portion of at least one magnetic recording medium; at least one laser power level sensor configured to detect a power level of the at least one laser diode; and a controller configured to modify one or more power level settings associated with the at least one laser diode in response to one or more output signals of the at least one laser power level sensor.

BRIEF DESCRIPTION OF DRAWINGS

The numerous advantages of the disclosure may be better understood by those skilled in the art by referencing the accompanying figures in which.

DETAILED DESCRIPTION

Figure 1:
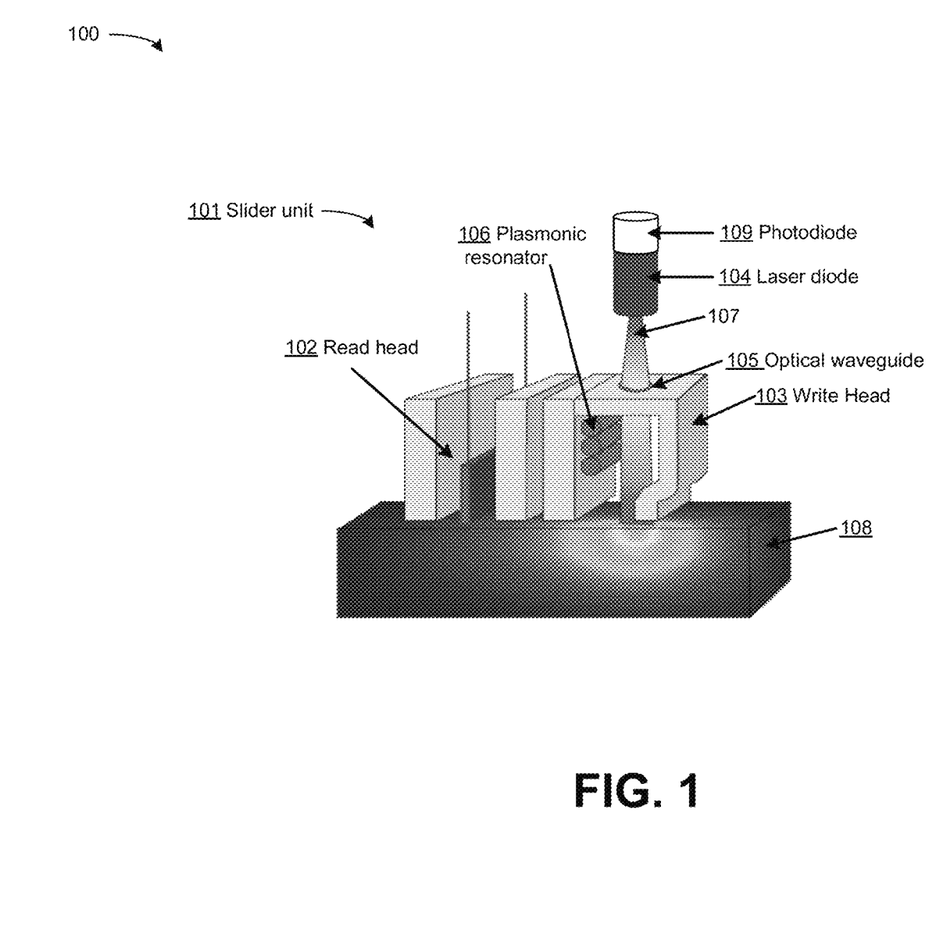
FIG. 1 shows a head/slider assembly and its relation to a recording medium in a HAMR system.
Figure 2:
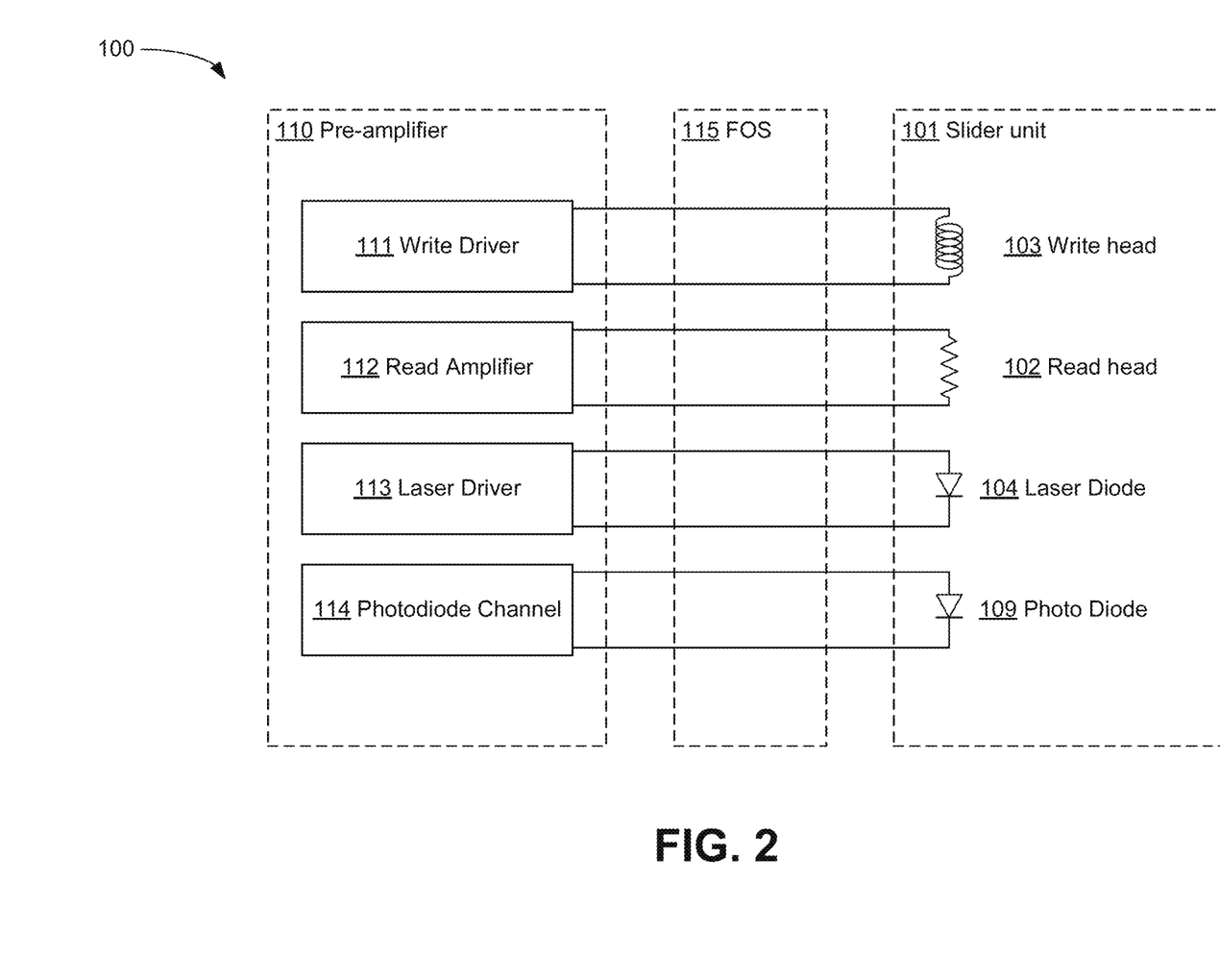
FIG. 2 shows a pre-amplifier chip containing elements employed in a HAMR system.

Referring to FIGS. 1 and 2, an exemplary embodiment of a HAMR system 100 implementation is shown. A carrier/slider unit 101 may contain at least one magnetoresistive read head 102 and at least one inductive write head 103. The slider unit 101 may further include a laser diode 104, an optical waveguide 105 and a plasmonic resonator 106. The waveguide 105 and the plasmonic resonator 106 may collimate the laser illumination 107 onto a confined region of medium 108 below the write head 103, thus locally heating the medium 108 to near the Curie temperature and enabling its switching by the write head 103. As a result of collocation, high laser power and poor light transduction-to-medium efficiency (e.g. ~100 mW and <1%, respectively) may lead to heating of the slider unit 101, which in turn may affect laser power emitted at a given current for the laser diode 104.

During a write process, the laser diode 104 may either continuously illuminate a spot on the medium 108 beneath the write head 103 or may be pulsed (e.g. one pulse per bit-write time).

The slider unit 101 may further include a photodiode 109 configured to monitor the operation of the laser diode 104 in order to allow for optimization of the laser diode 104. A fraction of the laser light generated by the laser diode 104 may be directed onto the photodiode 109, for example, by use of a semi-transmissive back-facet on the resonant cavity of the laser diode 104.

The HAMR system 100 may sample the photodiode 109 signal during intervals when no toggling of write head 103 driver signals or laser diode 104 driver signals are present. Although the present description assumes that the laser diode 104 is pulsed during a write operation in sympathy with data bit cells (e.g. a "pulse write"), the HAMR system 100 is also applicable to "continuous write" systems in which the laser diode 104 is remains on during course of data writing.

The photodiode 109 may be periodically activated only during the (read-only) servo bursts or elsewhere in read data. During activation, the laser diode 104 may be illuminated to a calibration power sufficiently low as not to cause long-term loss of servo data. Alternatively, laser calibration could occur over read data. Although described in reference to the photodiode 109, it is possible that other power/temperature monitoring means could be employed (e.g. the ability to sense temperature-induced change in the resistance of the read head 102 or a use of a dedicated bolometer).

Referring to FIG. 2 a schematic representation of a pre-amplifier 110 configured for control of the various components of the slider unit 101 is shown. The pre-amplifier 110 may include a write driver 111 configured to regulate the operation of the write head 103, a read amplifier 112 configured to receive read signals from the read head 102, a laser driver 113 configured to regulate operation of the laser diode 104 and a photodiode channel 114 configured to monitor operation of the photodiode 109.

All elements on the slider unit 101 may be served by a common flex-on-suspension (FOS) 115. Because write and read operations may be mutually exclusive, crosstalk from high-level writer signals into the pre-amplifier 110 front end may not pose problems. However, as conductors on the FOS 115 may be in close proximity, and generally cannot be provided with isolating shielding, the low-level photodiode 109 signal may be subject to high crosstalk levels from the high-level laser diode 104 drive and write head 103 drive signals.

The laser power in the HAMR system 100 may be regulated using sample-data closed-loop feedback from the photodiode 109 coupled to the laser diode 104. Use of a sample-data approach may assure that the FOS 115 transmission-line environment is quiet when the photodiode 109 is active. During photodiode 109 activation, the magnetic head and (in pulsed-laser mode) laser diode drivers may be dormant and their associated conductors of the FOS 115 may be static.

Figure 3:
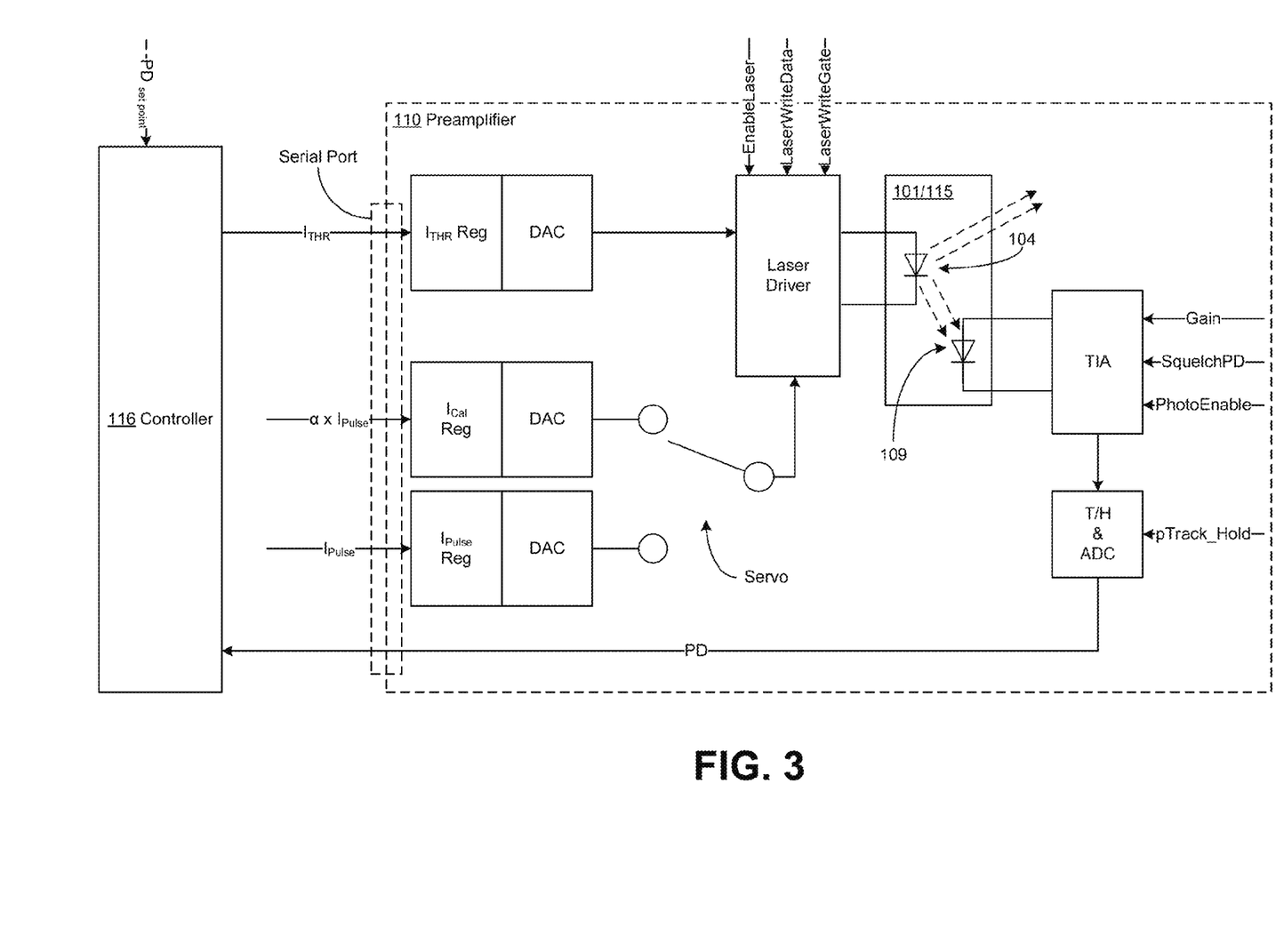
FIG. 3 shows an embodiment of a HAMR system.

Referring to FIG. 3, a block diagram of an exemplary embodiment of the HAMR system 100 is shown. In this embodiment, the power-regulation loop-closure may occur in microcode or in dedicated hardware in a system controller 116. As described above, the pre-amplifier 110 may include the laser driver 113. The pre-amplifier 110 may implement associated laser-current control values: laser threshold current ($I_{THR}$), normal pulse current ($I_{pulse}$); and a calibration current ($I_{cal}$). $I_{THR}$ specifies the threshold current used for both normal write and calibration operations; $I_{pulse}$ establishes the incremental pulse-over-$I_{THR}$ current used in normal write functions. $I_{cal}$ establishes the incremental laser current to be added to $I_{THR}$ during measurement of laser diode 104 intensity during loop updates.

The laser-current control values may be programmed into associated registers for the laser threshold current ($I_{THR}$Reg); normal pulse current ($I_{pulse}$Reg); and calibration current ($I_{cal}$Reg), respectively. To relieve stringent microcode timing requirements, these registers may be preferably realized in double-buffered form.

The photodiode 109 and photodiode channel 114 may be periodically activated during intervals when no writing is occurring, (e.g. during the servo position error signal generation bursts which may be interleaved with data). During such servo bursts, or other suitable calibration regions, the laser diode 104 may be driven with a current equal to $I_{THR}+I_{cal}$ sufficient to illuminate the laser and cause a measurable photodiode output, yet insufficient to cause long-term deterioration of prewritten servo data.

A multi-channel trans-impedance amplifier (TIA) may convert the photodiode 109 current to voltage, which is then held stable for digitization in a track/hold (T/H) circuit which may feed an analog-to-digital convertor (ADC). As disc files commonly employ a multiplicity of heads, the TIA may be configured to serve multiple heads and offer rapid recovery after write operations. The TIA and TH may have sufficiently fast acquisition time to acquire completely the photodiode 109 output level during a short servoburst interval. The held voltage may be subsequently digitized by the ADC, whose conversion process may overlap into the post-servoburst region. A comparatively slow/low cost successive-approximation ADC may thus be employed.

Because of wide slider-to-slider transmissivity tolerance differences of the laser diode 104-to-medium 108 and laser diode 104-to-photodiode 109 optical paths, photodiode 109 sensitivity, and spread in magnetic properties of the medium 108, power calibration of the laser diode 104 must be performed in relative fashion. Initially, optimal laser power for each slider unit 101 may determined based on recording performance (e.g. by iterative write/reads with various laser powers).

Once an optimal laser current value $I_{pulse}$ is determined for a specific slider unit 101, the following laser-power-control procedure may be followed (assumes influence of temperature on laser optical power is dominated by $I_{THR}$ variation):

1. Back-off laser current used for calibration by factor (e.g., α~0.4: $I_{cal}=\alpha^*I_{pulse}$) and store the resulting $I_{cal}$ to $I_{cal}$Reg. Backoff prevents gradual data destruction which would may occur were the full $I_{pulse}$ current used during calibration cycles.
2. Measure resulting photodiode 109 output with laser current at $I_{THR}+I_{cal}$. Output is $PD_{setpoint}$.
3. Throughout a multi-record write, and possibly for some time prior in order to allow for loop settling, periodically illuminate the laser with current $I_{THR}+I_{cal}$; sample (e.g. during servoburst) photodiode 109 output, and regulate it to PDsetpoint value by varying $I_{THR}$. Note that the same $I_{THR}$ applies to both writing and calibration operations. Microcode may implements the control algorithm. When a photodiode 109 output is ready, microcode operation may be interrupted to perform the control update, which is then written back into the double-buffered $I_{THR}$Reg register.

The above procedure may be refined to include temperature influence on current-to-optical power conversion slope or more elaborate algorithms (e.g. a discrete-time proportional-plus-integral control update where the integral term is be initialized with $I_{THR}$). Other sample data loop-closing algorithms may be employed, and are supported by the hardware structure of the invention.

Figure 4:
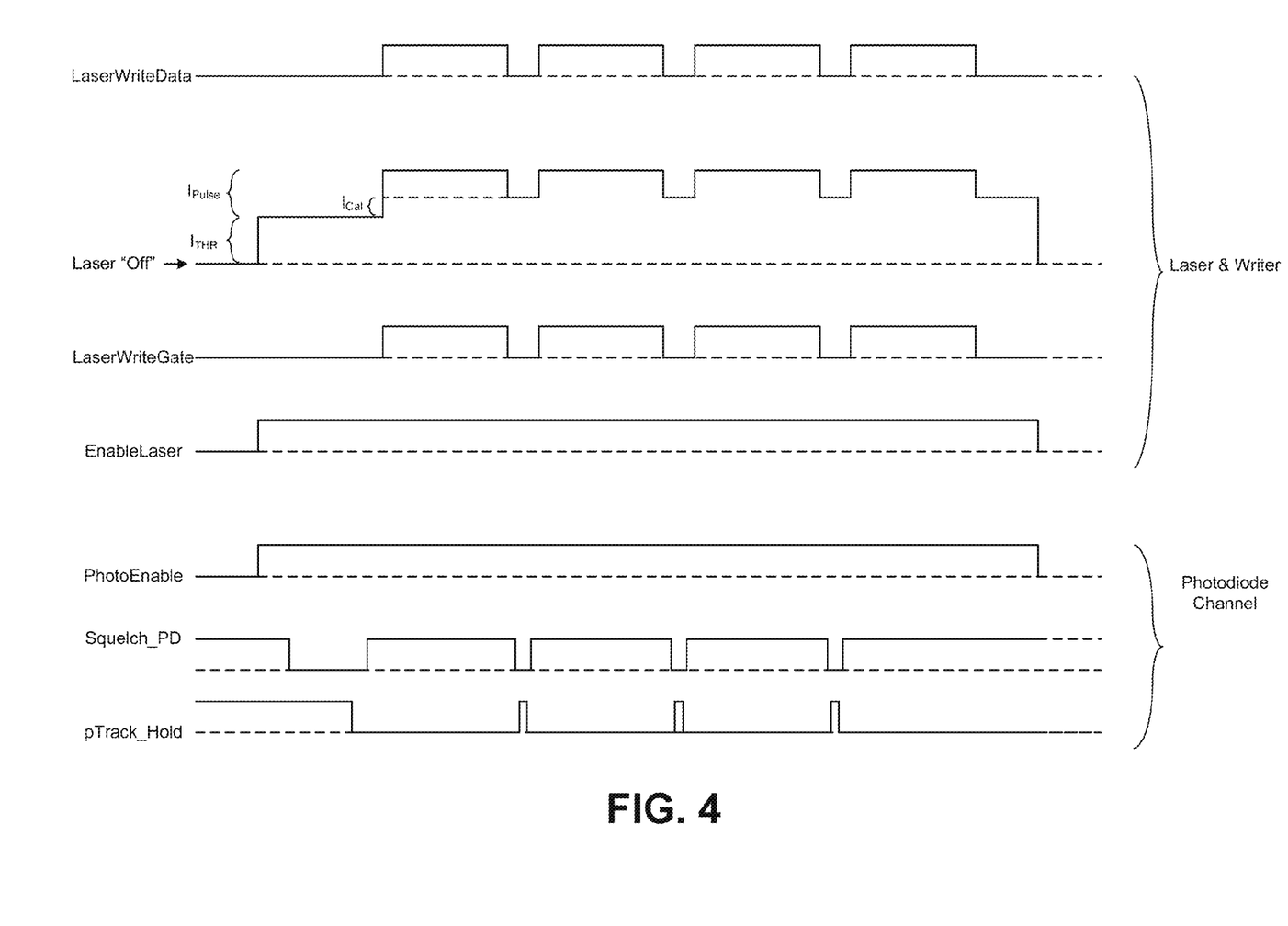
FIG. 4 shows waveforms representative of the operations of HAMR system.

Waveforms associated with above described operations of the HAMR system 100 of FIGS. 1-3 appear in FIG. 4.

Figure 5:
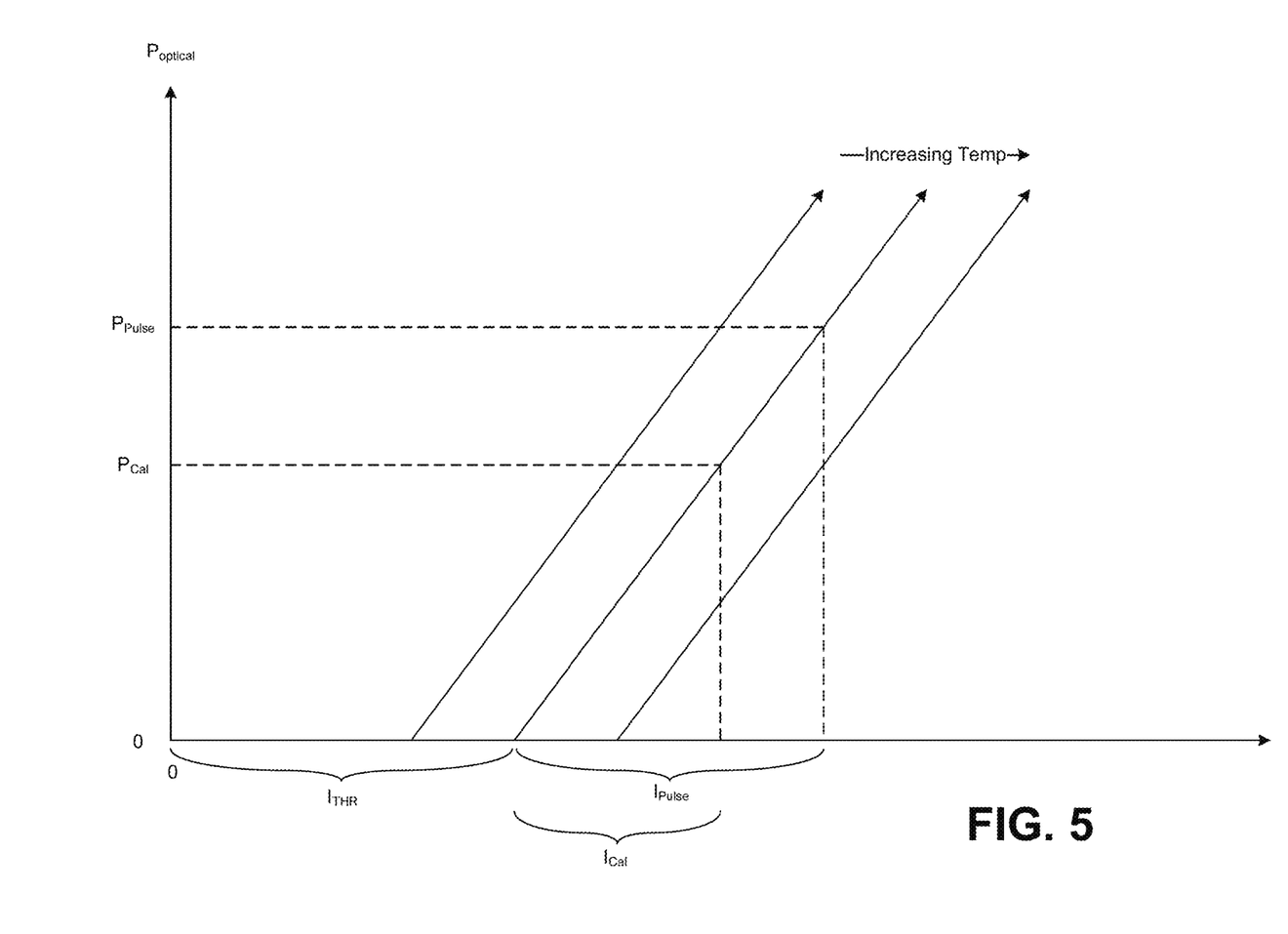
FIG. 5 shows a transfer function of a laser diode employed in a HAMR system.

FIG. 5 shows a laser diode electro-optical static transfer function on which is indicated the quantities referred to above. Assertion of an EnableLaser signal activates the laser diode 104 at $I_{THR}$, supporting rapid light buildup when a LaserWriteGate signal is asserted. During assertion of LaserWriteGate, in pulse mode operation, laser current is pulsed between $I_{THR}$ and $I_{peak}$ under influence of LaserWriteData. LaserWriteData pulses once per data-bitcell time, and originates in the controller circuits which may also generate runlengthencoded write data which may drive the magnetic recording head. In continuous mode, laser current rises to and remains at $I_{THR}+I_{peak}$ for the duration of assertion of LaserWriteGate.

LaserWriteGate is equivalent to the conventional WriteGate, which enables writing in the write head 103.

Figure 6:
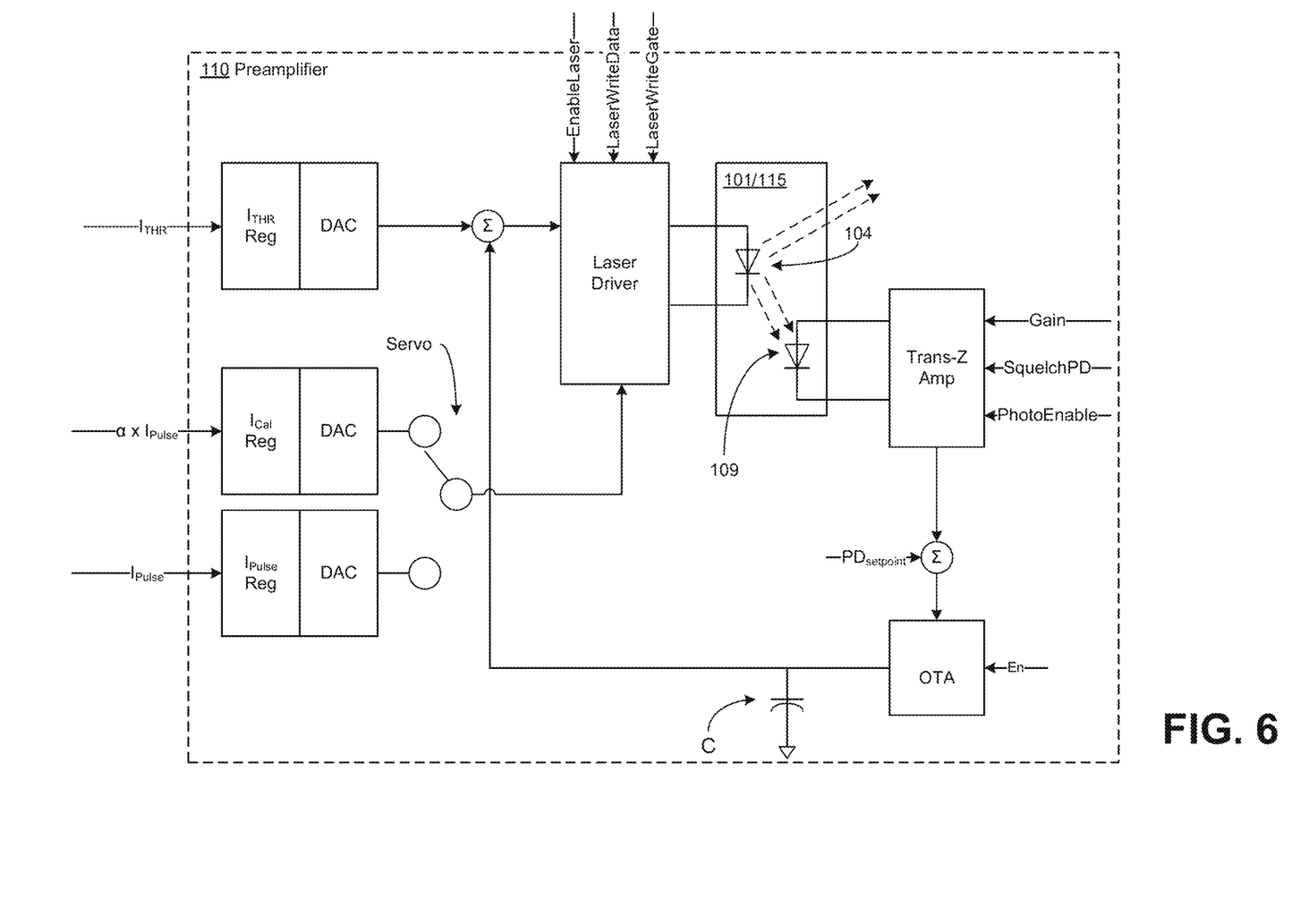
FIG. 6 shows an embodiment of a HAMR system.

Referring to FIG. 6, a block diagram of an exemplary embodiment of the HAMR system 100 is shown. As shown in FIG. 6, a loop closure may occur in the pre-amplifier 110, and at each sample/calibration instant, full update of laser power may occur. A gated operational transconductance amplifier (OTA) in conjunction with output capacitor C, performs an integral (k/s) operation when the OTA is enabled. When disabled, the capacitor C retains its charge/voltage until the next sample instant, when these variables may be again updated. Loop action trims the threshold current to establish equality between $PD_{setpoint}$ and measured output of the photodiode 109.

Although the exemplary embodiments of FIGS. 4 and 6 allocate the loop-closure law to the controller 116 and pre-amplifier 110, respectively, this partition is not required.

In a further implementation of a multi-photodiode (multi-slider) trans-impedance amplifier (TIA), the amplifier may be divided into front-end bias control OTA-C sections.

In operation, the (reverse-biased) photodiode 109 may be connected differentially between the sources of two complementary common-gate input stages which feed current mirrors; the mirror outputs may be connected to programmable-value load resistors. The differential voltage developed across the load resistors is buffered and transmitted to a T/H or a gated integrator.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It may be the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art has progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

What is claimed is:

1. A heat-assisted magnetic recording system comprising:
   at least one magnetic recording read/write head;
   at least one laser diode configured to illuminate at least a portion of at least one magnetic recording medium;
   a laser diode controller programmed for:
      configuring the at least one laser diode at a first non-zero power level setting during at least one magnetic recording write operation by the magnetic recording read/write head, and
      configuring the at least one laser diode at a second non-zero power level setting at a time other than during at least one magnetic recording write operation by the magnetic recording read/write head;
   at least one laser power level sensor configured to detect a power level of the at least one laser diode configured at the second non-zero power level at the time other than during at least one magnetic recording write operation by the magnetic recording read/write head; and
   the laser diode controller being further programmed for modifying at least one power level setting of the at least one laser diode in response to at least one output signal of the at least one laser power level sensor.

2. The system of claim 1, wherein the at least one laser diode is configured to illuminate at least one magnetic recording medium in a region of a magnetic recording/read write operation.

3. The system of claim 1, wherein the at least one laser power level sensor includes:
   at least one photodiode.

4. The system of claim 1, wherein the at least one laser power level sensor includes:
   at least one temperature sensor.

5. The system of claim 1, further comprising:
   at least one controller unit operably coupled to the at least one magnetic recording read/write head, the at least one laser diode, and the at least one laser power level sensor via an at least partially un-shielded connector.

6. The system of claim 5, wherein the at least partially un-shielded connector is a flexible-on-suspension connector.

7. A computer-implemented method for heat-assisted magnetic recording comprising: configuring at least one laser diode at a first non-zero power level setting during at least one magnetic recording write operation; configuring the at least one laser diode at a second non-zero power level setting lower than the first power level setting at a time other than during at least one magnetic recording write operation; detecting a power level of the at least one laser diode configured at the second power level setting at the time other than during at least one magnetic recording write operation with at least one laser diode power level sensor; and modifying at least one power level setting of the laser diode in response to at least one output signal of the at least one laser diode power level sensor.

8. The method of claim 7, wherein the at least one laser diode is configured to illuminate at least a portion of at least one magnetic recording medium.

9. The method of claim 7, wherein the first power level setting is associated with a magnetic recording write operation.

10. The method of claim 7, wherein the at least one laser diode power level sensor includes:
    at least one photodiode.

11. The method of claim 7, wherein the at least one laser diode power level sensor includes:
    at least one temperature sensor.

12. The method of claim 7, wherein the modifying at least one power level setting of the laser diode in response to at least one output signal of the at least one laser diode power level sensor includes:
    modifying at least one third non-zero power level setting of the laser diode that is less than both the first power level setting and the second power level setting in response to an output signal of the at least one laser diode power level sensor, wherein the first non-zero power level setting is a first fixed amount above the third non-zero power level setting and the second non-zero power level setting is a second fixed amount above the third non-zero power level setting.

13. A non-transitory computer readable medium including computer readable instructions for execution of a heat-assisted magnetic recording process on a computing device, the method comprising: configuring at least one laser diode at a first non-zero power level setting during at least one magnetic recording write operation; configuring the at least one laser diode at a second non-zero power level setting lower than the first power level setting at a time other than during at least one magnetic recording write operation; detecting a power level of the at least one laser diode configured at the second power level setting at the time other than during at least one magnetic recording write operation with at least one laser diode power level sensor; and modifying at least one power level setting of the laser diode in response to at least one output signal of the at least one laser diode power level sensor.

14. The method of claim 13, wherein the at least one laser diode is configured to illuminate at least one magnetic recording medium.

15. The method of claim 13, wherein the first power level setting is associated with a magnetic recording write operation.

16. The method of claim 13, wherein the at least one laser diode power level sensor includes:
at least one photodiode.

17. The method of claim 13, wherein the at least one laser diode power level sensor includes:
at least one temperature sensor.

18. The method of claim 13, wherein the modifying at least one power level setting of the laser diode in response to at least one output signal of the at least one laser diode power level sensor includes:
modifying at least one third non-zero power level setting of the laser diode that is less than both the first power level setting and the second power level setting in response to an output signal of the at least one laser diode power level sensor, wherein the first non-zero power level setting is a first fixed amount above the third non-zero power level setting and the second non-zero power level setting is a second fixed amount above the third non-zero power level setting.

19. The system of claim 1, wherein the laser diode controller programmed for modifying one or more power level settings associated with the at least one laser diode in response to at least one output signal of the at least one laser power level sensor is further configured for: modifying at least one third non-zero power level setting of the laser diode that is less than both the first power level setting and the second power level setting in response to an output signal of the at least one laser diode power level sensor, wherein the first non-zero power level setting is a first fixed amount above the third non-zero power level setting and the second non-zero power level setting is a second fixed amount above the third non-zero power level setting.

* * * * *